(12) United States Patent
Ota et al.

(10) Patent No.: US 10,066,953 B2
(45) Date of Patent: Sep. 4, 2018

(54) DESTINATION ESTIMATING SYSTEM AND DESTINATION ESTIMATING METHOD

(71) Applicant: MITSUBISHI ELECTRIC CORPORATION, Tokyo (JP)

(72) Inventors: Yuko Ota, Tokyo (JP); Masahiko Ikawa, Tokyo (JP); Hiroki Konaka, Tokyo (JP); Ryusuke Kinoshita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/504,184

(22) PCT Filed: Aug. 27, 2014

(86) PCT No.: PCT/JP2014/072415
§ 371 (c)(1),
(2) Date: Feb. 15, 2017

(87) PCT Pub. No.: WO2016/030986
PCT Pub. Date: Mar. 3, 2016

(65) Prior Publication Data
US 2017/0292847 A1    Oct. 12, 2017

(51) Int. Cl.
*G01C 21/26* (2006.01)
*G01C 21/34* (2006.01)
*G01C 21/36* (2006.01)

(52) U.S. Cl.
CPC ......... *G01C 21/3484* (2013.01); *G01C 21/26* (2013.01); *G01C 21/34* (2013.01); *G01C 21/3617* (2013.01)

(58) Field of Classification Search
CPC ......... G01C 21/00; G01C 21/26; G01C 21/34
See application file for complete search history.

(56) References Cited

U.S. PATENT DOCUMENTS 7,682,624 B2 *   3/2010   Gans ................... A61K 9/0095
                                                      424/439
7,925,426 B2 *   4/2011   Koebler ................... B60L 3/12
                                                      180/65.26
(Continued)

FOREIGN PATENT DOCUMENTS

JP          7-83678 A        3/1995
JP       2004-150853 A       5/2004
(Continued)

*Primary Examiner* — Yonel Beaulieu
(74) *Attorney, Agent, or Firm* — Birch, Stewart, Kolasch & Birch, LLP (57) ABSTRACT

It is an object of the present invention to provide a destination estimating system and a destination estimating method capable of estimating a destination with a high degree of accuracy even when a user uses a detour or stops off somewhere. The destination estimating system of the present invention includes: obtaining a traveling area and a traveling link of a moving body; obtaining, as a traveling history, an area history for storing, for each area, information of a past destination to which the moving body has traveled via the area previously and a link history for storing, for each link, information of a past destination to which the moving body has traveled via the link previously; estimating, based on the traveling area and the area history, a value regarding a probability of traveling to the past destination as an area estimation value; estimating, based on the traveling link and the link history, a value regarding a probability of traveling to the past destination as a link estimation value; and estimating the destination from the past destination based on the area estimation value and the link estimation value.

6 Claims, 7 Drawing Sheets

(56) References Cited

U.S. PATENT DOCUMENTS

| | | | |
|---|---|---|---|
| 9,792,736 B1* | 10/2017 | Koebler | G07C 5/008 |
| 2005/0228553 A1* | 10/2005 | Tryon | B60K 6/46 |
| | | | 701/22 |
| 2015/0300836 A1 | 10/2015 | Mizuno et al. | |
| 2018/0037117 A1* | 2/2018 | Koebler | B60K 35/00 |
| 2018/0065484 A1* | 3/2018 | Koebler | B60K 35/00 |
| 2018/0065485 A1* | 3/2018 | Koebler | B60K 35/00 |

FOREIGN PATENT DOCUMENTS

| | | |
|---|---|---|
| JP | 2005-283575 A | 10/2005 |
| JP | 2007-128121 A | 5/2007 |
| JP | 2012-208603 A | 10/2012 |
| JP | 2014-112301 A | 6/2014 |

* cited by examiner

DESTINATION ESTIMATING SYSTEM AND DESTINATION ESTIMATING METHOD

TECHNICAL FIELD

The present invention relates to a technique for estimating a destination of a vehicle.

BACKGROUND ART

A navigation system generally searches a route from a current location of a vehicle to a destination in accordance with a setting of the destination set by a user and performs a travel guidance along the searched route.

However, the user often uses the navigation system to display a map of an area surrounding the vehicle without setting the destination in a daily use. When the destination is not set as described above, there arises a problem that various functions of the navigation system using the destination such as a guidance to the destination and a vehicle control using the route to the destination, for example, cannot be brought out.

In order to cope with the above problem, Patent Document 1 indicates a technique for estimating the destination. According to the above technique, a plurality of destination candidates which can be the destination are extracted from a traveling history of the vehicle so as to be stored in a traveling history data memory, and when the vehicles travels without setting the destination, one of the destination candidates is estimated as the destination in accordance with a current traveling path of the vehicle and a frequency of arrival in each destination candidate to which the vehicle has traveled previously via the same traveling path as the current traveling path.

PRIOR ART DOCUMENTS

Patent Documents

[Patent Document 1]: Japanese Patent Application Laid-Open No. 07-83678

SUMMARY OF THE INVENTION

Problems to be Solved by the Invention

The technique of Patent Document 1 calculates a probability of the destination in accordance with the frequency of traveling to the destination candidate via the current traveling path. Accordingly, when a detour is used to avoid a crowded path or when the vehicle travels a road, which the vehicle does not normally travels, for fueling or for some business, for example, there is no or a little history that the vehicle has traveled the current traveling path previously, so that there arises a problem that an accuracy in estimating the destination is reduced.

The present invention has been made in view of the above-described problem, and it is an object of the present invention to provide a destination estimating system and a destination estimating method capable of estimating a destination with a high degree of accuracy even when a user uses a detour or stops off somewhere.

Means for Solving the Problems

A destination estimating system of the present invention includes: a processor executing a program; and a memory storing the program to perform processes, when being executed by the processor, of: obtaining a traveling area and a traveling link of a moving body; obtaining, as a traveling history, an area history storing, for each area, information of a past destination to which the moving body has traveled via the area previously and a link history storing, for each link, information of a past destination to which the moving body has traveled via the link previously; estimating, based on the traveling area and the area history, a value regarding a probability of traveling to the past destination as an area estimation value; estimating, based on the traveling link and the link history, a value regarding a probability of traveling to the past destination as a link estimation value; and estimating a destination from the past destination based on the area estimation value and the link estimation value.

A destination estimating method of the present invention includes steps of: obtaining a traveling area and a traveling link of a moving body, obtaining, as a traveling history, an area history for storing, for each area, information of a past destination to which the moving body has traveled via the area previously and a link history for storing, for each link, information of a past destination to which the moving body has traveled via the link previously, estimating an absolute value or a relative value of a probability of traveling to the past destination based on the traveling area and the area history as an area estimation value, estimating a value regarding a probability of traveling to the past destination based on the traveling link and the link history as a link estimation value, and estimating a destination from the past destination based on the area estimation value and the link estimation value.

Effects of the Invention

A destination estimating system of the present invention includes: a processor executing a program; and a memory storing the program to perform processes, when being executed by the processor, of: obtaining a traveling area and a traveling link of a moving body; obtaining, as a traveling history, an area history storing, for each area, information of a past destination to which the moving body has traveled via the area previously and a link history storing, for each link, information of a past destination to which the moving body has traveled via the link previously; estimating, based on the traveling area and the area history, a value regarding a probability of traveling to the past destination as an area estimation value; estimating, based on the traveling link and the link history, a value regarding a probability of traveling to the past destination as a link estimation value; and estimating a destination from the past destination based on the area estimation value and the link estimation value. Accordingly, the destination can be estimated even when a user uses a detour or stops off somewhere, and the destination can be estimated with a high degree of accuracy.

A destination estimating method of the present invention includes steps of: obtaining a traveling area and a traveling link of a moving body, obtaining, as a traveling history, an area history for storing, for each area, information of a past destination to which the moving body has traveled via the area previously and a link history for storing, for each link, information of a past destination to which the moving body has traveled via the link previously, estimating an absolute value or a relative value of a probability of traveling to the past destination based on the traveling area and the area history as an area estimation value, estimating a value regarding a probability of traveling to the past destination based on the traveling link and the link history as a link estimation value, and estimating a destination from the past destination based on the area estimation value and the link estimation value. Accordingly, the destination can be estimated even when a user uses a detour or stops off somewhere, and the destination can be estimated with a high degree of accuracy.

These and other objects, features, aspects and advantages of the present invention will become more apparent from the following detailed description of the present invention when taken in conjunction with the accompanying drawings.

PREFERRED EMBODIMENTS FOR IMPLEMENTING THE INVENTION

<A. Embodiment 1>
<A-1. Configuration>

A destination estimating system according to the embodiment 1 of the present invention is directed to a moving body such as a vehicle as a controlled object and estimates a destination of the moving body which is the controlled object. In the present specification, the description is on a basis that the vehicle is the controlled object.

Figure 1:
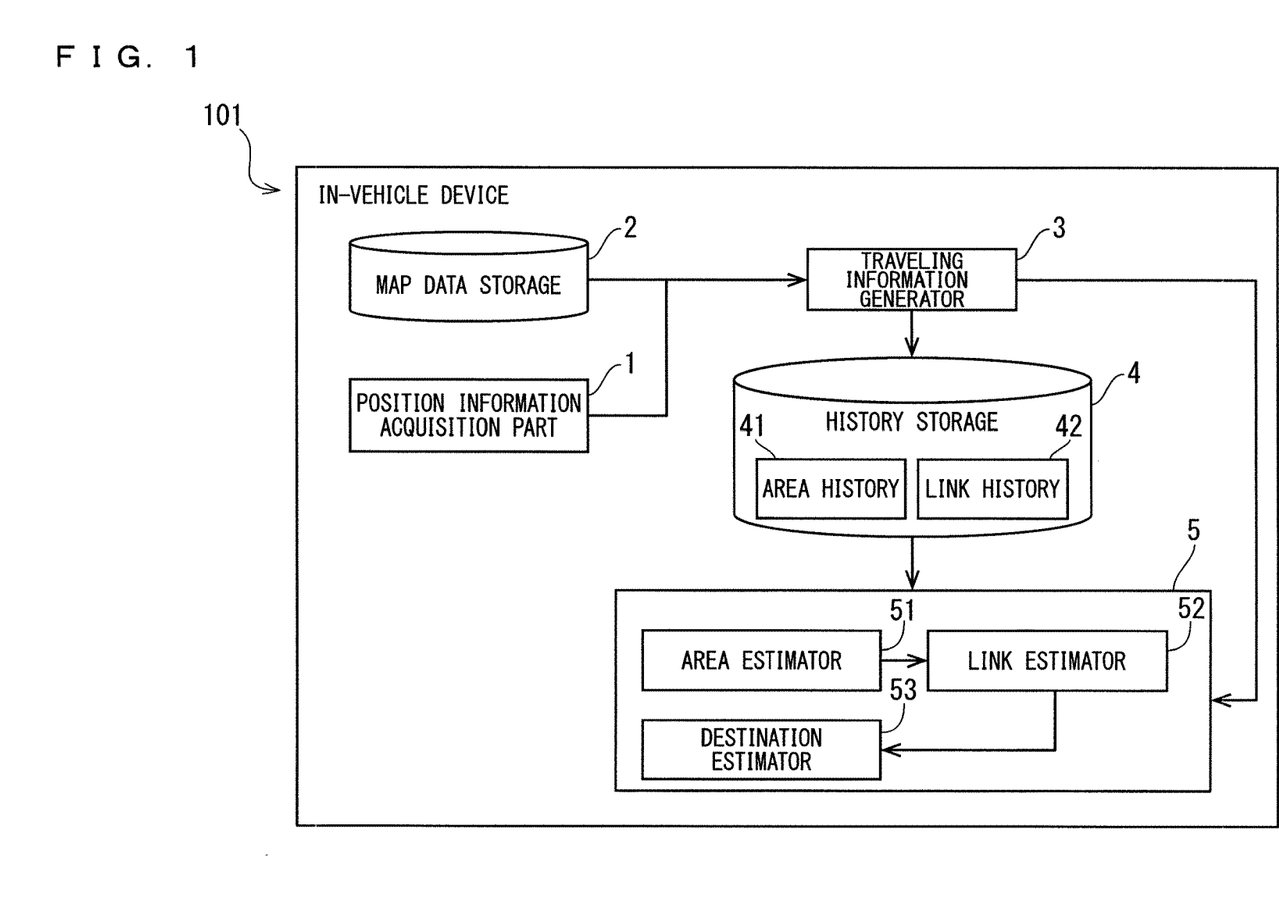
FIG. 1 A configuration diagram of a destination estimating system according to an embodiment 1.

A configuration of a destination estimating system 5 according to the embodiment 1 is described. FIG. 1 is a block diagram showing a configuration of a host system 101 including the destination estimating system 5 and shows a configuration that the destination estimating system 5 is incorporated in an in-vehicle device such as a navigation device.

The host system 101 includes, in addition to the destination estimating system 5, a position information acquisition part 1, a map data storage 2, a traveling information generator 3, and a history storage 4.

The position information acquisition part 1 obtains a current position information of a moving body such as the vehicle to which the destination estimating system 5 is directed as the controlled object. The position information is detected based on GPS (Global Positioning System), a gyro signal, and a speed and acceleration information, for example, and the detected position information may be mapped with a map data of the map data storage 2 so that the accuracy is further enhanced. The position information acquisition part 1 may have a configuration of detecting and obtain the position information by itself.

The map data storage 2, which is a storage medium for storing the map data, is made up of an HDD (Hard Disk Drive) and a memory stick, for example.

The traveling information generator 3 obtains the current position information of the vehicle from the position information acquisition part 1 and obtains the map data from the map data storage 2, and determines a current traveling area and traveling link based on the current position information and the map data. The information of the determined traveling area and the traveling link is output to the destination estimating system 5. The traveling information generator 3 generates an area history 41 and a link history 42 to store them in the history storage 4.

The area history 41 is a history information capable of referring to, for each area, a destination to which the vehicle has traveled via or from the area previously (referred to as the past destination, hereinafter) and a number of times that the vehicle has traveled to the past destination. The link history 42 is a history information capable of referring to, for each link, a destination to which the vehicle has traveled via or from the link previously (referred to as the past destination, hereinafter) and a number of times that the vehicle has traveled to the past destination. In generating the area history 41 and the link history 42, the traveling information generator 3 may determine the current position of the vehicle as the destination when the vehicles stops and a power source of the destination estimating system 101 turns off, or may also determine the current position of the vehicle as the destination when an engine of the vehicle turns off. Alternatively, it is also applicable to generate the history information only for the point corresponding to a POI (Point of Interest) of the map or a registration point of a user among the points determined as the destination.

Figure 4:
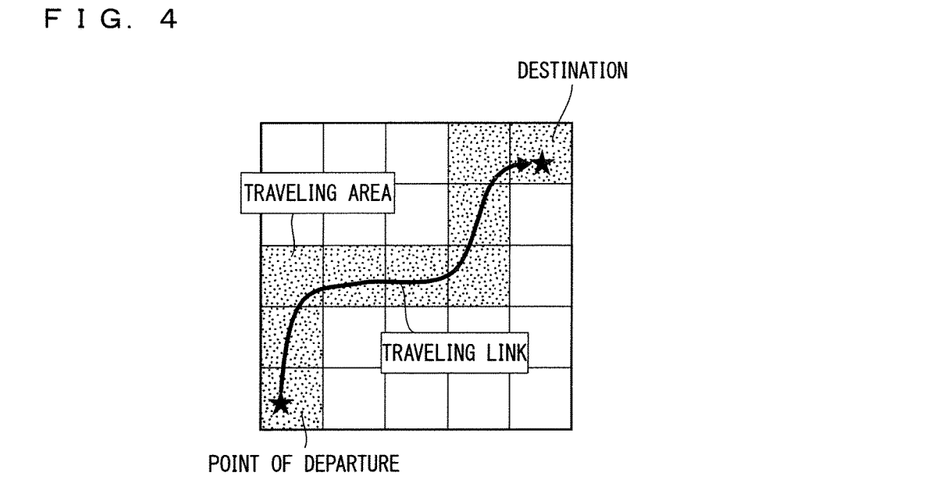
FIG. 4 A diagram showing a traveling link and a traveling area.

FIG. 4 shows the traveling area and the traveling link. When the vehicle travels from a point of departure to a destination, a traveling route of the vehicle becomes the traveling link and a segmented region on the map, that is to say, the area to which the traveling route belongs becomes the traveling area. For example, the area is a rectangular region of 2 km square.

The history storage 4, which is a storage medium for storing the area history 41 and the link history 42, is made up of an HDD and a memory stick, for example.

The destination estimating system 5 includes an area estimator 51, a link estimator 52, and a destination estimator 53.

The area estimator 51 functions as a traveling information acquisition part to obtain the traveling area information from the traveling information generator 3 and further functions as a traveling history acquisition part to obtain the area history 41 from the history storage 4. Then, the area estimator 51 evaluates, based on the obtained information, a traveling probability for each past destination in the current point in accordance with an area estimation, that is to say, a probability that the past destination becomes the destination in the current traveling as an area estimation value. The area estimator 51 performs an update processing of the area estimation at a predetermined timing as in a case that the traveling area is switched.

The link estimator 52 functions as a traveling information acquisition part to obtain the traveling link information from the traveling information generator 3 and further functions as a traveling history acquisition part to obtain the link history 42 from the history storage 4. Then, the link estimator 52 evaluates, based on the obtained information, a traveling probability for each past destination in the current point in accordance with a link estimation, that is to say, a probability that the past destination becomes the destination in the current traveling as a link estimation value. The link estimator 52 performs an update processing of the link estimation at a predetermined timing. For example, when the traveling link is switched and the vehicle travels half of a length of a new link, the link estimator 52 performs the update processing.

Since the link estimation is performed based on the current traveling link and the link history 42, the link estimation cannot performed when the current traveling link cannot be determined or when the link history 42 does not include enough history regarding the current traveling link. In such a case, the link estimator 52 complements the link estimation using the area estimation. The detail of the complement is described hereinafter.

The destination estimator 53 estimates the destination from among the past destination based on the link estimation result of the link estimator 52. For example, the past destination which has the highest link estimation value may be estimated as the destination, or all of the past destinations which have link estimation value higher than a predetermined threshold value may be estimated as the destination.

The traveling information generator 3 and the destination estimating system 5 are achieved by a CPU (Central Processing Unit) for performing a program stored in a memory such as a RAM (Random Access Memory).

Figure 2:
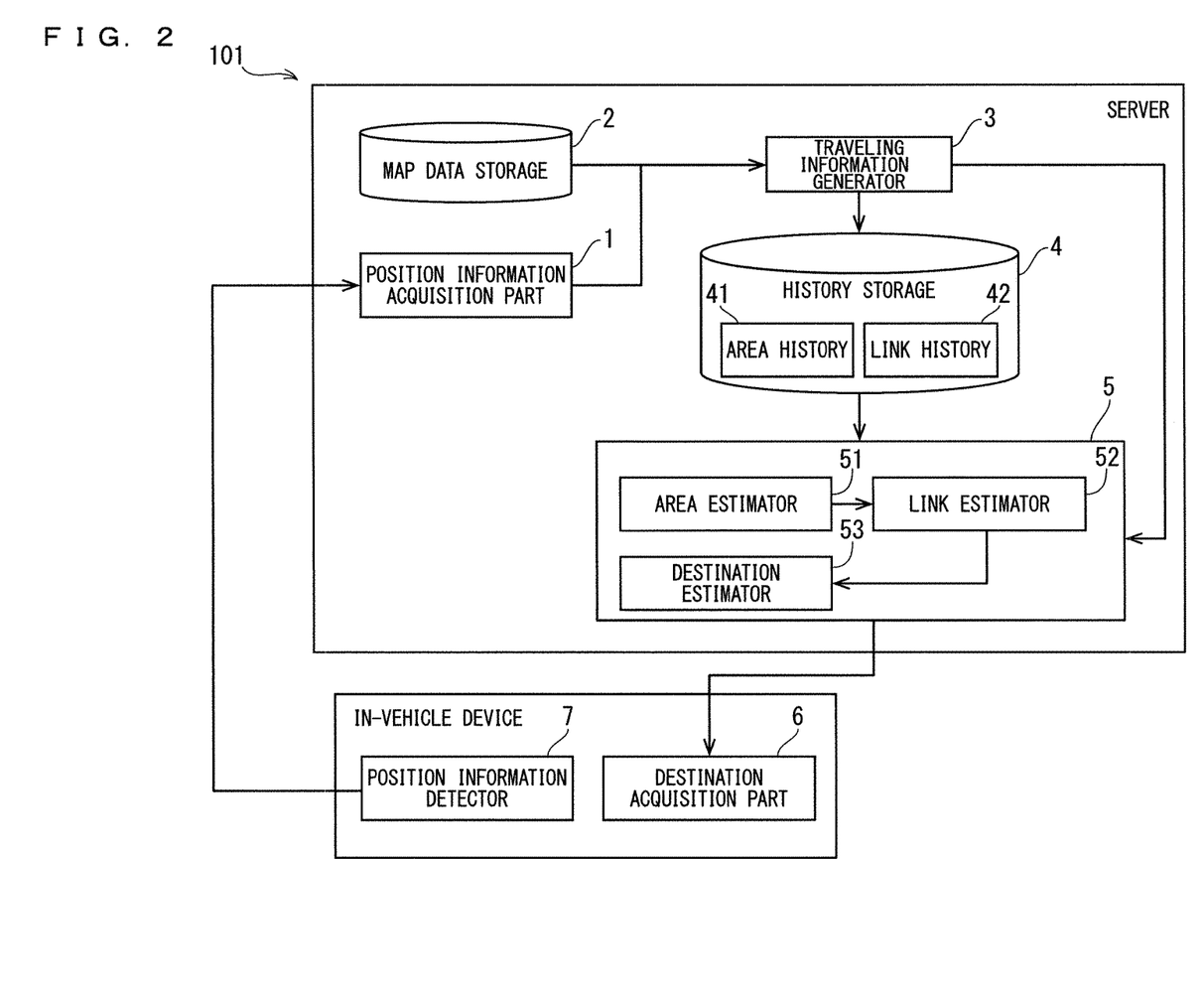
FIG. 2 A configuration diagram of the destination estimating system according to the embodiment 1.
Figure 3:
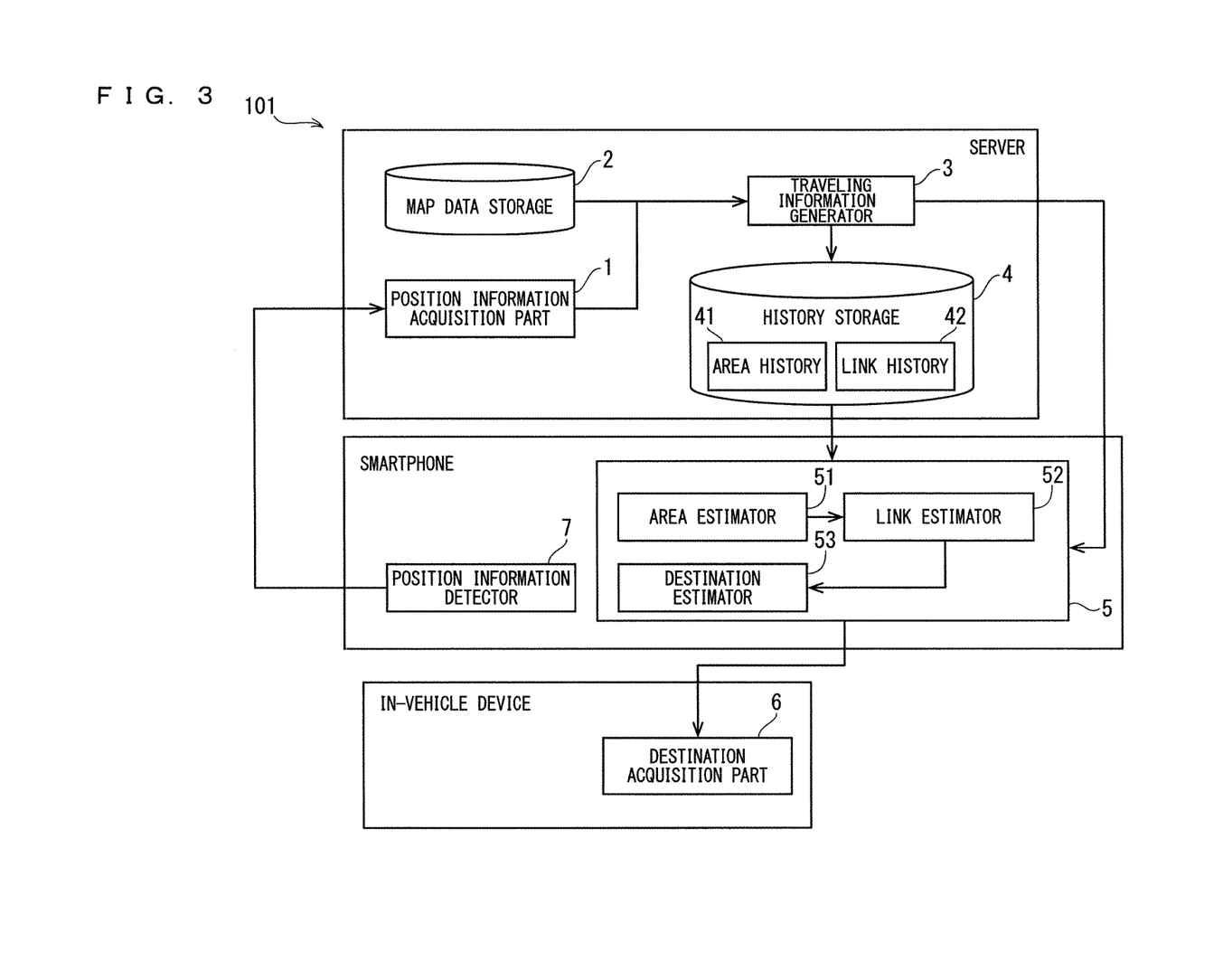
FIG. 3 A configuration diagram of the destination estimating system according to the embodiment 1.

In the above description, the host system 101 is described as the in-vehicle device, however, the host system 101 may also be made up of a combination of an in-vehicle device and a server as shown in FIG. 2 or a combination of an in-vehicle device, a smartphone, and a sever as shown in FIG. 3. That is to say, each configuration of the host system 101 may be separately disposed in the in-vehicle device, the smartphone, and the server as appropriate.

In the configuration of FIG. 2, each configuration of the host system 101 illustrated in FIG. 1 is disposed in the server, and a position information detector 7 and a destination acquisition part 6 are provided in the in-vehicle device. The position information acquisition part 1 of the server obtains the position information of the vehicle detected by the position information detector 7. The destination acquisition part 6 obtains the destination estimated by the destination estimating system 5 of the server.

In the configuration of FIG. 3, the destination estimating system 5 and the position information detector 7 are disposed in the smartphone and only the destination acquisition part 6 is disposed in the in-vehicle device.

<A-2. Operation>

Figure 5:
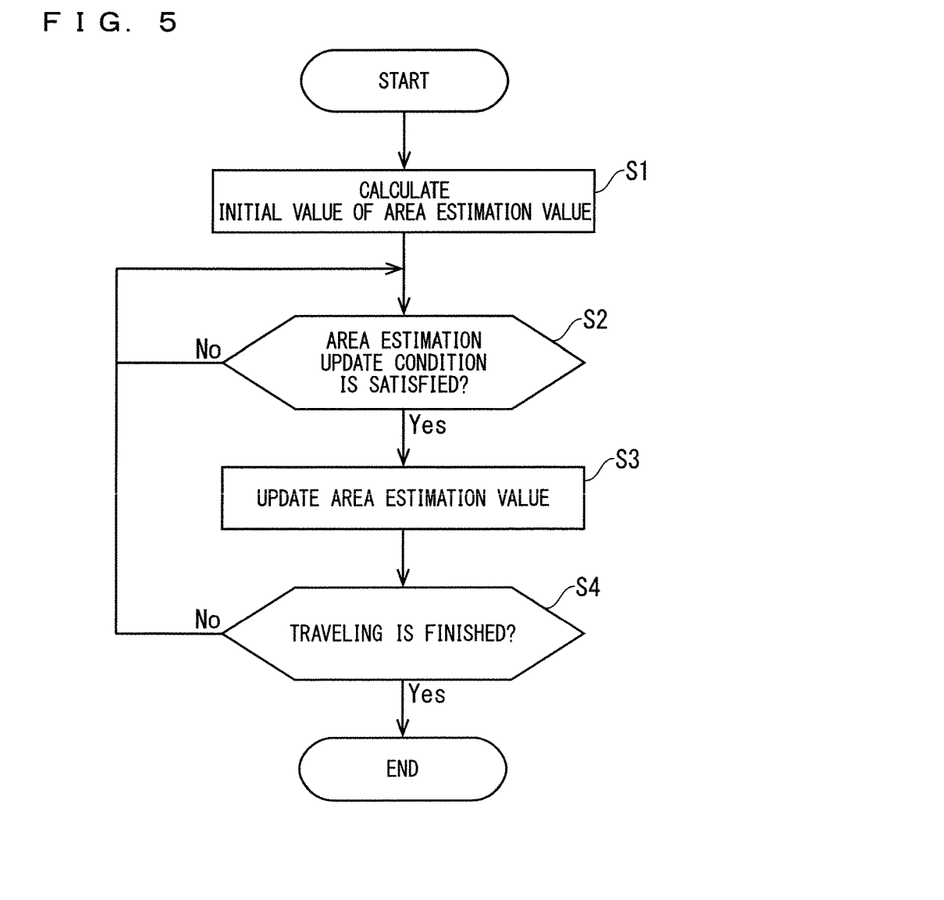
FIG. 5 A flow chart showing an operation of the destination estimating system according to the embodiment 1.
Figure 6:
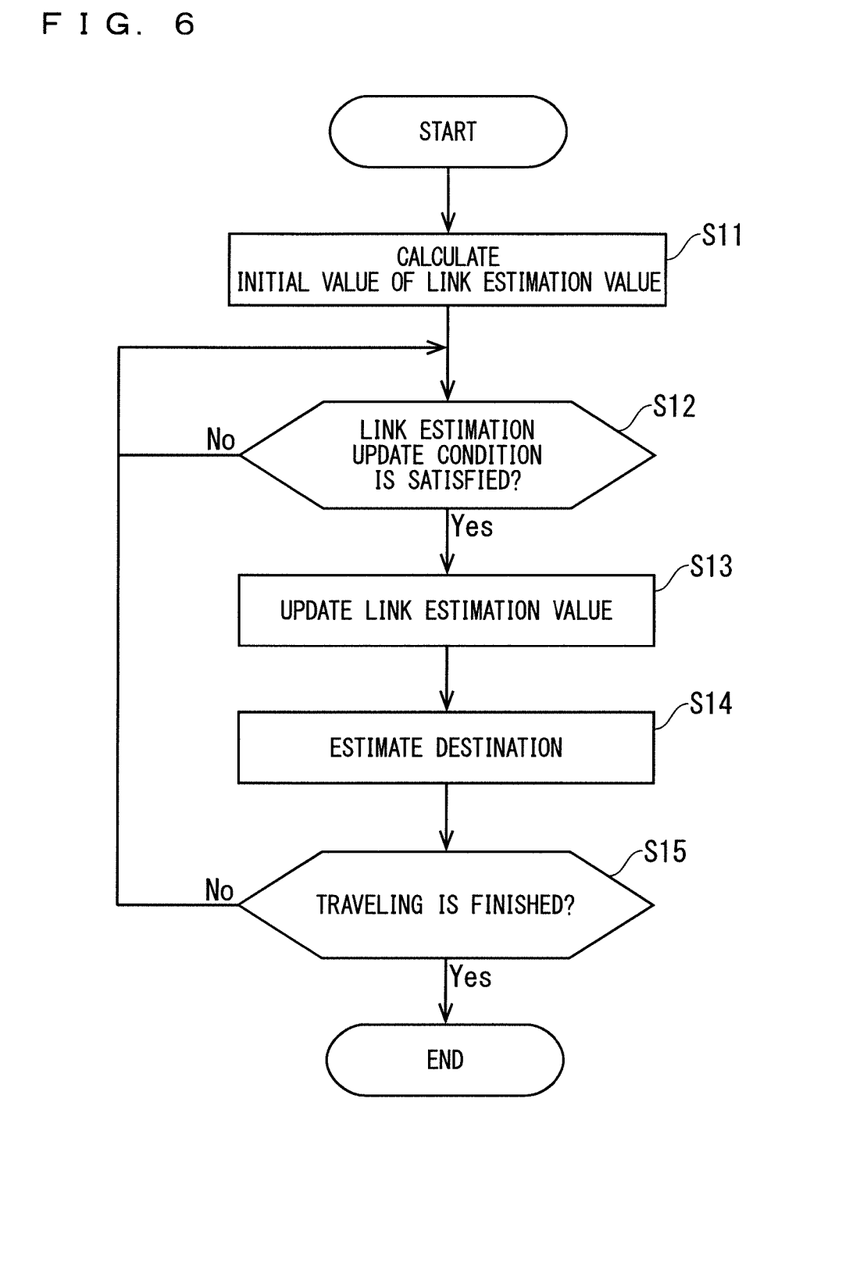
FIG. 6 A flow chart showing an operation of the destination estimating system according to the embodiment 1.

Next, a destination estimating operation in the destination estimating system 5 is described. FIG. 5 is a flow chart showing an area estimating operation in the area estimator 51. FIG. 6 is a flow chart showing a link estimating operation in the link estimator 52.

The area estimator 51 calculates an initial value of the area estimation value when the vehicle starts traveling (a step S1). A calculation method of the area estimation value is described along a flow chart in FIG. 7 which illustrates the calculation method.

Figure 7:
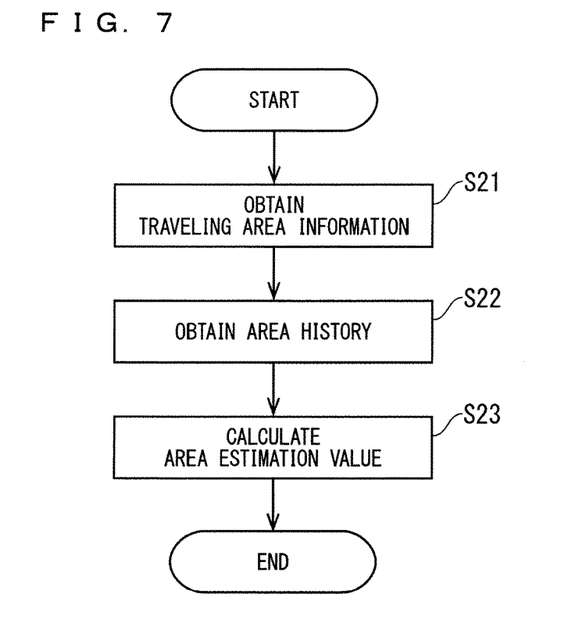
FIG. 7 A flow chart showing an operation of the destination estimating system according to the embodiment 1.

Firstly, the area estimator 51 obtains the traveling area information from the traveling information generator 3 (a step S21). The traveling area information indicates information that the area where the vehicle is currently traveling can be uniquely specified from the map data.

Next, the area history is obtained based on the traveling area information (a step S22). That is to say, the destination which the vehicle has reached when the vehicle traveled the current traveling area previously (the past destination) and the number of times that the vehicle has reached the past destination are obtained.

Then, the area estimation is performed in accordance with the area history information. That is to say, the probability of traveling to the past destination is calculated as the area estimation value for all of the past destinations (a step S23). Herein, an initial value $P_{area(0)}(X)$ of the area estimation value for a past destination X is calculated by (the number of times that the vehicle has reached the past destination X via the current traveling area)/(the number of times that the vehicle has traveled the current traveling area previously).

When the initial value $P_{area(0)}(X)$ of the area estimation value is calculated as described above, the operation returns to FIG. 5, and subsequently, it is determined whether or not an area estimation update condition is satisfied (a step S2). The area estimation update condition indicates, for example, a change of the traveling area in the traveling area information.

When the area estimation update condition is satisfied, the area estimation value is updated (a step S3). A procedure of the update processing here is similar to that illustrated by the flow chart in FIG. 7. That is to say, the traveling area information is newly obtained from the traveling information generator 3 (the step S21), and the area history based on the new traveling area information is newly obtained (the step S22). Then, the area estimation value is calculated (updated) by the following equation based on the area history (the step S23).

[Equation 1]

$$P_{area(i)}(X) = \alpha P_{area(i-1)}(X) + (1-\alpha) P'_{area(i)}(X) \qquad (1)$$

Herein, $P_{area(i)}(X)$ represents the area estimation value for the past destination X in accordance with the i-th area estimation, and a is a coefficient equal to or larger than 0 but smaller than 1. $P'_{area(i)}(X)$ represents the probability of traveling to the past destination X based on the current traveling area calculated by (the number of times that the vehicle has reached the past destination X via the current traveling area)/(the number of times that the vehicle has traveled the current traveling area previously). As described above, the area estimation value is recursively obtained as a linear sum of the traveling probability calculated based on the new traveling area and the area estimation value before the update processing, so that the area estimation can be performed with a high degree of accuracy.

When the area estimation value is updated in the above manner, it is determined whether or not the travel is finished (a step S4), and the steps S2 and S3 are repeated until the travel is finished.

Next, a link estimation operation of the link estimator 52 is described along the flow chart in FIG. 6. The link estimator 52 calculates an initial value of the link estimation value when the vehicle starts traveling (a step S11). That is to say, the timing of starting the initial value of the link estimation value is similar to the timing of starting the initial value of the area estimation value, so that the flow charts in FIGS. 5 and 6 are processed in parallel. A calculation method of the link estimation value is described along a flow chart in FIG. 8 which illustrates the calculation method.

Figure 8:
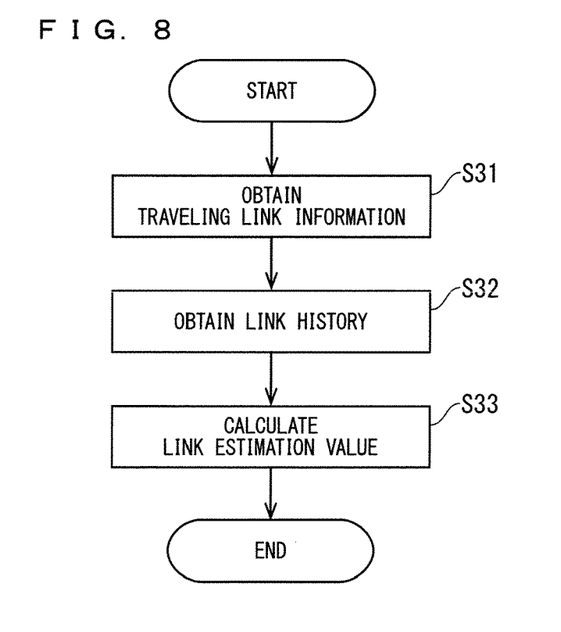
FIG. 8 A flow chart showing an operation of the destination estimating system according to the embodiment 1.

Firstly, the link estimator 52 obtains the traveling link information from the traveling information generator 3 (a step S31). The traveling link information indicates information that the link where the vehicle is currently traveling can be uniquely specified from the map data.

Next, the link history is obtained based on the traveling link information (a step S32). That is to say, the destination which the vehicle has reached when the vehicle traveled the current traveling link previously (the past destination) and the number of times that the vehicle has reached the past destination are obtained.

Then, the link estimation is performed in accordance with the link history information. That is to say, the probability of traveling to the past destination is calculated as the link estimation value for all of the past destinations (a step S33). Herein, an initial value $P_{link(0)}(X)$ of the link estimation value is calculated by (the number of times that the vehicle has reached the past destination X via the current traveling link)/(the number of times that the vehicle has traveled the current traveling link previously).

When the initial value of the link estimation value is calculated as described above, the operation returns to FIG. 6, and subsequently, it is determined whether or not a link estimation update condition is satisfied (a step S12). The link estimation update condition includes that, for example, the vehicle travels half of a length of a new traveling link or more after the traveling link of the vehicle is switched. Alternatively, the link estimation may be updated when the vehicle has traveled a predetermined distance after the last update of the link estimation result when the current traveling link is unclear. The link estimation may also be updated at predetermined time intervals. In the above case, the time interval of the link estimation processing is ensured, so that a load from the destination estimation processing is kept constant to some extent.

When the link estimation update condition is satisfied, the link estimation value is updated (a step S13). A procedure of the update processing here is similar to that illustrated by the flow chart in FIG. 8. That is to say, the traveling link information is newly obtained from the traveling information generator 3 (the step S31), and the link history based on the new traveling link information is newly obtained (the step S32). Then, the link estimation value is calculated (updated) by the following equation based on the link history (the step S33).

[Equation 2]

$$P_{link(i)}(X)=\beta P_{link(i-1)}(X)+(1-\beta)P'_{link(i)}(X) \quad (2)$$

Herein, $P_{link(i)}(X)$ represents the link estimation value for the past destination X in accordance with the i-th link estimation, and β is a coefficient equal to or larger than 0 but smaller than 1. $P'_{link(i)}(X)$ represents the probability of traveling to the past destination X based on the current traveling link calculated by (the number of times that the vehicle has reached the past destination X via the current traveling link)/(the number of times that the vehicle has traveled the current traveling link previously). As described above, the link estimation value is recursively obtained as a linear sum of the traveling probability calculated based on the new traveling link and the link estimation value before the update processing, so that the link estimation can be performed with a high degree of accuracy.

As described above, the link estimation is performed based on the current traveling link and the link history 42. Accordingly, the link estimation cannot performed when the current traveling link cannot be determined by the traveling information generator 3 or when the link history 42 does not include enough history regarding the current traveling link. When the vehicle is in a parking area, for example, a corresponding traveling link is not included in the map data, so that the traveling link cannot be determined. When the vehicle travels a detour, which the vehicle does not normally travels, by reason that a traffic jam occurs on a road due to a construction work, the traveling link can be determined, however, the link history 42 does not include enough corresponding link history, so that the link estimation cannot be performed with a high degree of accuracy.

In the above case, the link estimator 52 obtains a latest area estimation result $P_{area(j)}(X)$ from the area estimator 51, and a linear combination of $P_{area(j)}(X)$ and (i−1)-th link estimation value $P_{link(i-1)}(X)$ is determined as i-th link estimation value $P_{link(i)}(X)$. That is to say, $P_{link(i)}(X)$ is calculated by the following equation.

[Equation 3]

$$P_{link(i)}(X)=\beta P_{link(i-1)}(X)+(1-\beta)P_{area(j)}(X) \quad (3)$$

As described above, when the link estimator 52 cannot perform the link estimation, the link estimation value is calculated from the linear combination of the link estimation value before the update processing and the latest area estimation value to gradually approximate the link estimation value to the area estimation value.

When the link estimation value is updated as described above (the step S13), the destination estimating system 5 subsequently estimates the destination (a step S14). The destination estimating system 5 estimates the destination from among the past destination based on the link estimation result of the link estimator 52. For example, the past destination which has the highest link estimation value may be estimated as the destination, or all of the past destinations which have link estimation values higher than a predetermined threshold value may be estimated as the destination.

Subsequently, it is determined whether or not the vehicle has finished traveling (a step S15), and the update processing of the link estimation value is continued until the vehicle finishes traveling (the steps S12 and S13).

Described above is the update method that the link estimation value is calculated from the linear combination of the link estimation value before the update processing and the latest area estimation value to gradually approximate the link estimation value to the area estimation value, however, it is an example of the method that the link estimation is complemented using the area estimation. As another example, it is also applicable not to update the link estimation value but to estimate the destination based on the area estimation value when the link estimation cannot be performed. In the above case, the past destination which has the highest area estimation value may be estimated as the destination, or the plurality of past destinations which have area estimation values higher than a predetermined threshold value may be estimated as the destination. However, the update method that the link estimation value is gradually approximated to the area estimating value is adopted to reflect the past link estimation value in the update value, so that the estimation accuracy can be enhanced.

In the above description, the area estimation value and the link estimation value are described as the probability of traveling to the destination, and they may be represented as absolute values from 0 to 1 or may also be represented as a value equal to or more than 1 as a relative value with respect to the probability of traveling to another past destination.

The destination estimated as described above can be used in the background to provide information of a traffic jam or a closure of a route to the destination, for example. The information of the traffic jam or the closure, for example, can be provided by a display part and an audio output part. As a modification example, an route to the estimated destination may be displayed on the display part or may be used for setting the destination automatically.

<A-3. Effect>

The destination estimating system according to the embodiment 1 includes: the traveling information acquisition part to obtain the traveling area and the traveling link of the moving body; the traveling history acquisition part which obtains, as the traveling history, the area history 41 for storing, for each area, the information of the past destination to which the moving body has traveled via the area previously and the link history 42 for storing, for each link, the information of the past destination to which the moving body has traveled via the link previously; the area estimator 51 which estimates the value regarding the probability of traveling to the past destination based on the traveling area and the area history as the area estimation value; the link estimator 52 which estimates the value regarding the probability of traveling to the past destination based on the traveling link and the link history as the link estimation value; and the destination estimator 53 which estimates the destination from the past destination based on the area estimation value and the link estimation value. The link estimation can estimate the destination with the high degree of accuracy compared with the area estimation, however, the link estimation may not be performed when the moving body travels the route which the moving body does not normally travels, for example, so that the destination is estimated using both the area estimation value and the link estimation value, and the destination is estimated by the link estimation with the high degree of accuracy, and when the link estimation cannot be performed, the link estimation can be complemented by the area estimation.

The area estimator 51 updates the area estimation value from the linear combination of the area estimation value estimated based on the current traveling area and the area history and the area estimation value before the update processing. The link estimator 52 updates the link estimation value from the linear combination of the link estimation value estimated based on the current traveling link and the link history and the link estimation value before the update processing. The destination estimator 53 estimates the destination from the past destination based on the link estimation value. When the link estimation value cannot be estimated based on the traveling link and the link history, the link estimator 52 updates the link estimation value from the linear combination of the link estimation value before the update processing and the latest area estimation value. The case where the link estimation value cannot be estimated based on the traveling link and the link history indicates at least one of the case where the traveling information acquisition part cannot obtain the traveling link and the case where the link history does not store the predetermined number of the histories of the traveling link or more. The above update method is adopted, so that when the link estimator 52 cannot perform the link estimation, the link estimation value is gradually approximated to the area estimating value while reflecting the past link estimation value, thus the estimation accuracy can be increased compared to the case of estimating the destination using the area estimation value immediately.

The destination estimating method according to embodiment 1 is a destination estimating method using the destination estimating system 101 including the traveling information acquisition part, the traveling history acquisition part, the area estimator 51, the link estimator 52, and the destination estimator 53. The traveling information acquisition part obtains the traveling area and the traveling link of the moving body. The traveling history acquisition part obtains, as the traveling history, the area history 41 for storing, for each area, the information of the past destination to which the moving body has traveled via the area previously and the link history 42 for storing, for each link, the information of the past destination to which the moving body has traveled via the link previously. The area estimator 51 estimates the relative value of the probability of traveling to the past destination based on the traveling area and the area history as the area estimation value. The link estimator 52 estimates the relative value of the probability of traveling to the past destination based on the traveling link and the link history as the link estimation value. The destination estimator 53 estimates the destination from the past destination based on the area estimation value and the link estimation value. However, each step of the method is not limited to be performed in the order described above. The link estimation can estimate the destination with the high degree of accuracy compared with the area estimation, however, the link estimation may not be performed when the moving body travels the route which the moving body does not normally travels, so that the destination is estimated using both the area estimation value and the link estimation value, and the destination is estimated by the link estimation with the high degree of accuracy, and when the link estimation cannot be performed, the link estimation can be complemented by the area estimation.

<B. Embodiment 2>
<B-1. Configuration>

Figure 9:
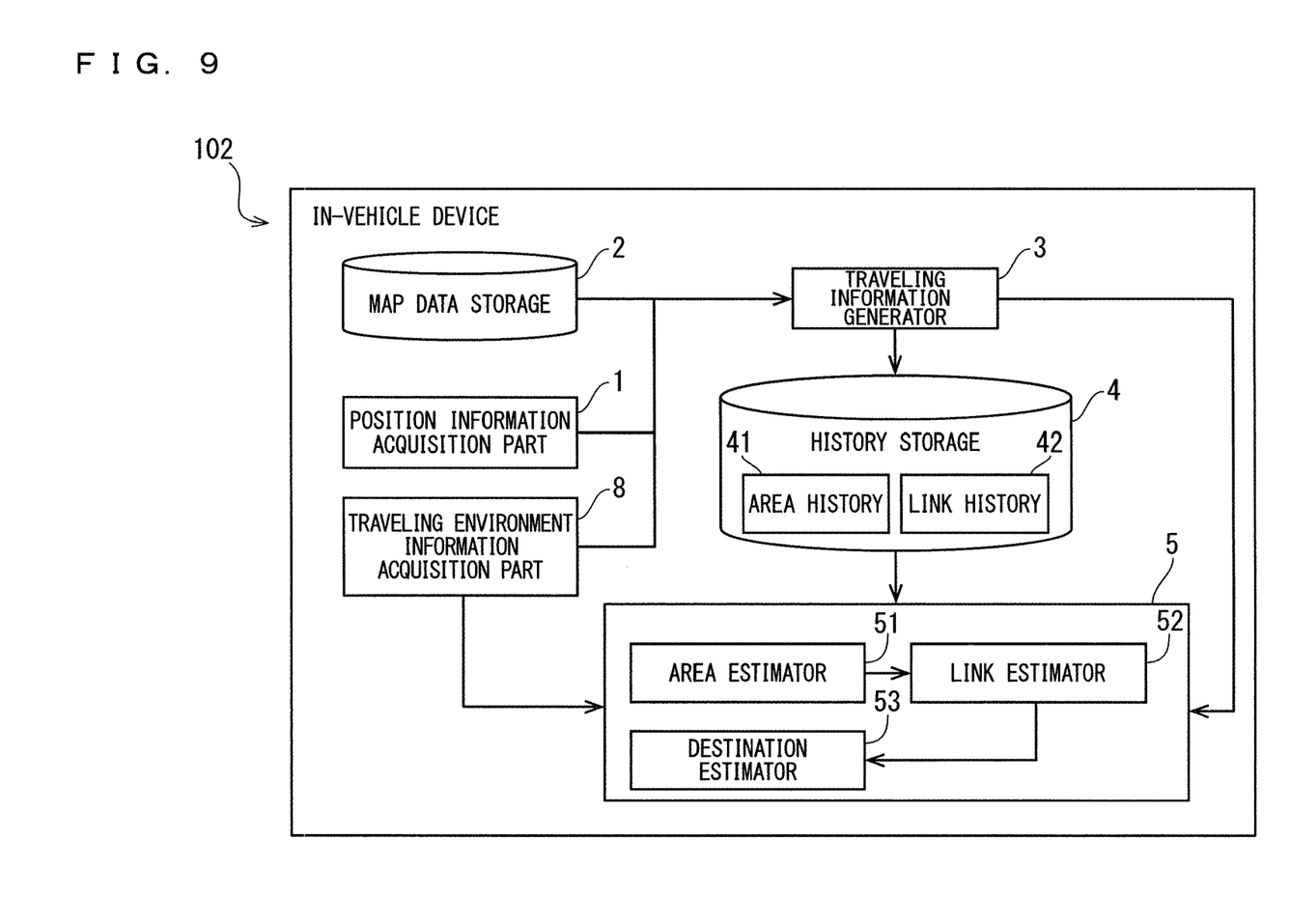
FIG. 9 A configuration diagram of the destination estimating system according to an embodiment 2.

FIG. 9 is a block diagram showing a configuration of a host system 102 according to the embodiment 2. FIG. 9 illustrates the host system 102 as an in-vehicle device, however, the configuration described in the embodiment 2 is similar to that of the embodiment 1 in that the host system 102 may also be made up of a combination of an in-vehicle device and a server or a smartphone.

The host system 102 shown in FIG. 9 includes a traveling environment information acquisition part 8 in addition to the configuration of the host system 101 shown in FIG. 1, and the other configuration of the host system 102 is similar to that of the host system 101.

The traveling environment information acquisition part 8 obtains a traveling environment information. The traveling environment information indicates information of the traveling environment which may be a factor in determining the destination of the vehicle when the vehicle travels, and the traveling environment includes a current time, a current day of the week, and a number of passengers, for example. The information of the current time and the current day of the week can be obtained by receiving a standard wave. The information of the number of passengers can be obtained from a state where a seatbelt is fastened or unfastened.

The traveling information generator 3 generates the area history 41 and the link history 42 including the traveling environment information. That is to say, the area history 41 is the history information capable of referring to, for each area, the traveling environment information when the vehicle has traveled previously, in addition to the destination to which the vehicle has traveled via or from the area previously (the past destination) and the number of times that the vehicle has traveled to the past destination. The link history 42 is the history information capable of referring to, for each link, the traveling environment information when the vehicle has traveled previously, in addition to the destination to which the vehicle has traveled via or from the link previously (the past destination) and the number of times that the vehicle has traveled to the past destination.

<B-2. Operation>

Next, a destination estimating operation in the destination estimating system 5 is described.

The area estimator 51 obtains the current traveling area and the area history 41 from the traveling information generator 3 and the history storage 4, respectively. Then, the area estimator 51 evaluates, based on the obtained information, the traveling probability for each past destination in the current point in accordance with the area estimation, that is to say, the probability that the past destination becomes the destination as the area estimation value.

In the embodiment 1, the area estimation value of the past destination is evaluated from the past traveling history whose traveling area corresponds to the current traveling area. In the embodiment 2, however, the area estimation value of the past destination is evaluated from the past traveling history whose traveling area corresponds to the current traveling area and whose traveling environment information corresponds to the current traveling environment information. That is to say, the initial value $P_{area(0)}(X)$ of the area estimation value for the past destination X is calculated by (the number of times that the vehicle has traveled to the past destination X via the current traveling area in the same traveling environment as the current one)/(the number of times that the vehicle has traveled the current traveling area in the same traveling environment as the current one previously).

The area estimator 51 updates the area estimation value at a predetermined timing, for example, when the traveling area is switched. The update processing of the area estimation value is similar to that of the embodiment 1, so that the description is omitted.

The link estimator 52 obtains the traveling link information and the link history 42 from the traveling information generator 3 and the history storage 4, respectively. Then, the link estimator 52 evaluates, based on the obtained information, the traveling probability for each past destination in the current point in accordance with the link estimation, that is to say, the probability that the past destination becomes the destination as the link estimation value.

In the embodiment 1, the link estimation value of the past destination is evaluated from the past traveling history whose traveling link corresponds to the current traveling link. In the embodiment 2, however, the link estimation value of the past destination is evaluated from the past traveling history whose traveling link corresponds to the current traveling link and whose traveling environment information corresponds to the current traveling environment information. That is to say, the initial value $P_{link(0)}(X)$ of the link estimation value for the past destination X is calculated by (the number of times that the vehicle has traveled to the past destination X via the current traveling link in the same traveling environment as the current one)/ (the number of times that the vehicle has traveled the current traveling link in the same traveling environment as the current one previously).

The link estimator 52 updates the link estimation value at a predetermined timing, for example, when the traveling link is switched and the vehicle travels half of the length of the new link. The update processing of the link estimation value is similar to that of the embodiment 1, so that the description is omitted.

When the link estimation cannot be performed by reason that the current traveling link cannot be determined by the traveling information generator 3 or the link history 42 does not include enough history regarding the current traveling link, for example, the link estimation is complemented by the area estimation. For example, the link estimation value is calculated from the linear combination of the link estimation value before the update processing and the latest area estimation value. The update processing in the above case is also similar to that of the embodiment 1, so that the detailed description is omitted.

The operation of the destination estimator 53 is similar to that of the embodiment 1.

As described above, the destination can be estimated from the traveling history which meets the traveling environment of the user by performing the area estimation and the link estimation using the past traveling history whose traveling environment information corresponds to the current traveling environment information, so that the estimation accuracy can be enhanced.

<B-3. Modification Example>

It is also applicable that the area estimator 51 not only performs the area estimation from the past traveling history whose traveling environment corresponds to the current traveling environment but also weights the number of times that the vehicle has traveled in accordance with a degree of coincidence with the current traveling environment, when obtaining it from the area history, so as to use the traveling history whose traveling environment does not completely correspond to the current traveling environment as well. The same can be applied to the link estimator 52, so that it is also applicable, when the number of times that the vehicle has traveled is obtained from the link history, to weight the number of times that the vehicle has traveled in accordance with a degree of coincidence with the current traveling environment so as to use the traveling history whose traveling environment does not completely correspond to the current traveling environment as well. Accordingly, the area estimation or the link estimation can be performed even when there is not enough period of time to store the traveling history, and thereby there is not enough number of traveling histories whose traveling environments correspond to the current traveling environment.

<B-4. Effect>

In the destination estimating system according to the embodiment 2, the area history 41 and the link history 42 obtained by the traveling history acquisition part includes the traveling environment information at a time that the moving body has traveled to the past destination, and the traveling environment information includes at least one of the time, the day of the week, the number of passengers in the moving body. The area estimator 51 obtains the number of times that the moving body has traveled to the past destination via the traveling area from the area history whose traveling environment information corresponds to the current traveling environment information and then estimates the area estimation value of the destination candidate based on the number of times that the moving body has traveled. The link estimator 52 obtains the number of times that the moving body has traveled to the destination candidate via the traveling link from the link history whose traveling environment information corresponds to the current traveling environment information and then estimates the link estimation value of the destination candidate based on the number of times that the moving body has traveled. Accordingly, the destination can be estimated from the traveling history which meets the traveling environment of the user with the high degree of accuracy.

Alternatively, the area estimator 51 weights, based the degree of coincidence with the traveling environment information, and obtains the number of times that the vehicle has traveled to the destination candidate via the traveling area from the area history 41 so as to estimate the area estimation value of the destination candidate based on the number of times that the vehicle has traveled to the destination candidate. The link estimator 52 weights, based on the degree of coincidence with the traveling environment information, and obtains the number of times that the vehicle has traveled to the destination candidate via the traveling link from the link history 42 so as to estimate the link estimation value of the destination candidate based on the number of times that the vehicle has traveled to the destination candidate. Accordingly, the destination can be estimated from the traveling history which meets the traveling environment of the user with the high degree of accuracy even when there is not enough period of time to store the traveling history, and thereby there is not enough number of traveling histories whose traveling environments correspond to the current traveling environment.

The above embodiments of the present invention can be appropriately modified, omitted, or freely combined within the scope of the invention.

The present invention has been shown and described in detail, the foregoing description is in all aspects illustrative and not restrictive. It is therefore understood that numerous modifications and variations can be devised without departing from the scope of the invention.

REFERENCE SIGNS LIST

1 Position information acquisition part, 2 Map data storage, 3 Traveling information generator, 4 History storage, 5 Destination estimating system, 6 Destination acquisition part, 7 Position information detector, 8 Traveling environment information acquisition part, 41 Area history, 42 Link history, 51 Area estimator, 52 Link estimator, 53 Destination estimator, 101 102 Host system

The invention claimed is:

1. A destination estimating system, comprising:
a processor executing a program; and
a memory storing said program to perform processes, when being executed by said processor, of:
obtaining a traveling area and a traveling link of a moving body;
obtaining, as a traveling history, an area history storing, for each area, information of a past destination to which said moving body has traveled via said area previously and a link history storing, for each link, information of a past destination to which said moving body has traveled via said link previously;
estimating, based on said traveling area and said area history, a value regarding a probability of traveling to said past destination as an area estimation value;
estimating, based on said traveling link and said link history, a value regarding a probability of traveling to said past destination as a link estimation value; and
estimating a destination from said past destination based on said area estimation value and said link estimation value.

2. The destination estimating system according to claim 1, wherein
said estimation of said area estimation value includes an update of said area estimation value from a linear combination of said area estimation value estimated based on a current traveling area and said area history and said area estimation value before an update processing,
said estimation of said link estimation value includes an update of said link estimation value from a linear combination of said link estimation value estimated based on a current traveling link and said link history and said link estimation value before an update processing,
said estimation of said destination includes an estimation of a destination from said past destination based on said link estimation value,
when said link estimation value cannot be estimated based on said traveling link and said link history, said estimation of said link estimation value includes an update of said link estimation value from a linear combination of said link estimation value before an update processing and said area estimation value being estimated last, and
a case where said link estimation value cannot be estimated based on said traveling link and said link history indicates at least one of a case where said processor cannot obtain said traveling link and a case where said link history does not store a predetermined number of histories of said traveling link or more.

3. The destination estimating system according to claim 1, wherein
said area history includes a traveling environment information at a time of traveling to said past destination,
said link history includes a traveling environment information at a time of traveling to said past destination, and
said traveling environment information includes at least one of a time, a day of a week, and a number of passengers in said moving body.

4. The destination estimating system according to claim 3, wherein
said estimation of said area estimation value includes an obtainment of a number of times that said moving body has traveled to said past destination via said traveling area from said area history whose traveling environment information corresponds to a current traveling environment information and an estimation of said area estimation value of said past destination based on said number of times that said moving body has traveled, and
said estimation of said link estimation value includes an obtainment of a number of times that said moving body has traveled to said past destination via said traveling link from said link history whose traveling environment information corresponds to a current traveling environment information and an estimation of said link estimation value of said past destination based on said number of times that said moving body has traveled.

5. The destination estimating system according to claim 3, wherein
said estimation of said area estimation value includes a weighting, based on a degree of coincidence with said traveling environment information, and obtainment of said number of times that said moving body has traveled to said past destination via said traveling area from said area history and an estimation of said area estimation value of said past destination based on said number of times that said moving body has traveled to said past destination, and
said estimation of said link estimation value includes a weighting, based on a degree of coincidence with said traveling environment information, and obtainment of said number of times that said moving body has traveled to said past destination via said traveling link from said link history and an estimation of said link estimation value of said past destination based on said number of times that said moving body has traveled to said past destination.

6. A destination estimating method, comprising steps of:

obtaining a traveling area and a traveling link of a moving body, obtaining, as a traveling history, an area history for storing, for each area, information of a past destination to which said moving body has traveled via said area previously and a link history for storing, for each link, information of a past destination to which said moving body has traveled via said link previously, estimating an absolute value or a relative value of a probability of traveling to said past destination based on said traveling area and said area history as an area estimation value, estimating a value regarding a probability of traveling to said past destination based on said traveling link and said link history as a link estimation value, and estimating a destination from said past destination based on said area estimation value and said link estimation value.

* * * * *